US009896080B2

(12) United States Patent
Yogo et al.

(10) Patent No.: US 9,896,080 B2
(45) Date of Patent: Feb. 20, 2018

(54) BRAKE DEVICE

(71) Applicant: ADVICS CO., LTD., Kariya-shi, Aichi-ken (JP)

(72) Inventors: Kazutoshi Yogo, Aichi-gun (JP); Yasunori Sakata, Toyota (JP); Shuichi Yonemura, Takahama (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 0 days.

(21) Appl. No.: 15/038,760

(22) PCT Filed: Nov. 18, 2014

(86) PCT No.: PCT/JP2014/080470
§ 371 (c)(1),
(2) Date: May 24, 2016

(87) PCT Pub. No.: WO2015/079973
PCT Pub. Date: Jun. 4, 2015

(65) Prior Publication Data
US 2017/0001614 A1 Jan. 5, 2017

(30) Foreign Application Priority Data

Nov. 29, 2013 (JP) ................................. 2013-248111

(51) Int. Cl.
*B60T 13/66* (2006.01)
*B60T 13/14* (2006.01)
(Continued)

(52) U.S. Cl.
CPC .......... *B60T 13/662* (2013.01); *B60T 8/4872* (2013.01); *B60T 13/146* (2013.01); *B60T 13/686* (2013.01); *B60T 2201/022* (2013.01)

(58) Field of Classification Search
CPC ........ B60T 8/48; B60T 8/4827; B60T 8/4836; B60T 8/4845; B60T 8/4872;
(Continued)

(56) References Cited

U.S. PATENT DOCUMENTS 4,800,289 A * 1/1989 Adachi ................... B60T 8/445
303/116.1
4,950,038 A 8/1990 Ocvirk et al.
(Continued)

FOREIGN PATENT DOCUMENTS

JP 01-311940 A 12/1989
JP 04-066360 A 3/1992
(Continued)

OTHER PUBLICATIONS

International Search Report of PCT/JP2014/080470 dated Feb. 24, 2015.

*Primary Examiner* — Thomas J Williams
(74) *Attorney, Agent, or Firm* — Sughrue Mion, PLLC

(57) ABSTRACT

A brake device is characterized by being provided with an auxiliary pressure source 100 that accumulates a predetermined range of brake fluid pressure in an accumulator 102 on the basis of an operation of a fluid pressure pump 101, and that outputs the brake fluid pressure as an accumulator pressure; and an electromagnetic valve 110, 111 that controls blocking of communication between the fluid pressure pump 101 and the accumulator 102 and a main pipe line, and that transmits the accumulator pressure to a wheel cylinder when placed in communication state.

4 Claims, 3 Drawing Sheets

(51) Int. Cl.
 *B60T 13/68* (2006.01)
 *B60T 8/48* (2006.01)

(58) Field of Classification Search
 CPC .... B60T 13/142; B60T 13/143; B60T 13/145;
  B60T 13/146; B60T 13/662; B60T 13/68;
  B60T 13/686; B60T 13/745
 USPC ..................................................... 303/114.1
 See application file for complete search history.

(56) References Cited

U.S. PATENT DOCUMENTS

| | | | | |
|---|---|---|---|---|
| 5,240,314 A | * | 8/1993 | Morita | B60T 8/365 |
| | | | | 137/529 |
| 5,407,257 A | * | 4/1995 | Iwata | B60T 8/175 |
| | | | | 303/113.2 |
| 5,560,690 A | * | 10/1996 | Hattori | B60T 8/175 |
| | | | | 303/116.2 |
| 5,568,962 A | * | 10/1996 | Enomoto | B60L 7/26 |
| | | | | 303/152 |
| 6,024,420 A | * | 2/2000 | Yonemura | B60T 7/12 |
| | | | | 303/113.2 |
| 6,053,582 A | * | 4/2000 | Ganzel | B60T 8/4018 |
| | | | | 188/358 |
| 6,224,168 B1 | * | 5/2001 | Yamada | B60T 7/22 |
| | | | | 303/10 |
| 6,293,633 B1 | * | 9/2001 | Hara | B60T 8/17616 |
| | | | | 303/113.2 |
| 6,460,942 B1 | * | 10/2002 | Shimizu | B60T 7/042 |
| | | | | 303/11 |
| 6,554,372 B1 | * | 4/2003 | Mackiewicz | B60T 8/4045 |
| | | | | 303/11 |
| 2014/0265546 A1 | | 9/2014 | Shimizu et al. | |

FOREIGN PATENT DOCUMENTS

| | | |
|---|---|---|
| JP | 04-85160 A | 3/1992 |
| JP | 2008-302717 A | 12/2008 |
| JP | 2013-209051 A | 10/2013 |

* cited by examiner

BRAKE DEVICE

CROSS REFERENCE TO RELATED APPLICATIONS

This is a National Stage of International Application No. PCT/JP2014/080470 filed Nov. 18, 2014, claiming priority based on Japanese Patent Application No. 2013-248111 filed Nov. 29, 2013, the contents of all of which are incorporated herein by reference in their entirety.

TECHNICAL FIELD

The present invention relates to a brake device capable of increasing braking force with a good response.

BACKGROUND ART

In the past, there has been provided a brake device which can improve braking force with a good response based on a sucking/discharging operation of brake fluid with a pump disposed in a fluid pressure circuit (for example, see Patent Document 1). More specifically, the brake device has a configuration in which a plurality of electromagnetic valves and a pump are disposed in a fluid pressure circuit disposed between a master cylinder (to be referred to as an M/C hereinafter) and a wheel cylinder (to be referred to as a W/C hereinafter) corresponding to each wheel. Of the plurality of electromagnetic valves, while an electromagnetic valve disposed in a main pipe line coupling the M/C and the W/C is set in a differential pressure state, the pump is driven to supply brake fluid to the W/C side to improve boosting response of a W/C pressure so as to increase the braking force with a good response.

PRIOR ART DOCUMENT

Patent Document

Patent Document 1: Japanese Unexamined Patent Publication No. 2008-302717

SUMMARY OF INVENTION

Object of the Invention

However, boosting response of a W/C pressure is desired to be further improved. For example, in a vehicle which performs control to improve safety such as collision avoidance control or the like which detects an obstacle in the vehicle traveling direction to urgently stop a vehicle or change the course of the vehicle, the boosting response of the W/C pressure is desired to be further improved to increase braking force with a better response. In particular, in a large-size vehicle such as a truck, securing of the boosting response of the W/C pressure is important to improve the safety of the vehicle.

The present invention has been made in consideration of the above points, and has as its object to provide a brake device capable of further improving boosting response of a W/C pressure.

Means for Achieving the Object

In order to achieve the above object, this invention includes a brake fluid pressure control actuator having a main pipe line coupling a brake fluid pressure generating means generating a brake fluid pressure in accordance with an operation of a brake operation member and a plurality of W/Cs, a differential pressure control valve disposed in the main pipe line, dividing the main pipe line into a first pipe line on a brake fluid pressure generating means side and a second pipe line on the plurality of W/C sides, and generating a differential pressure to control a differential pressure between the first pipe line and the second pipe line, a motor, a pump driven with the motor to suck/discharge a brake fluid, controlling a differential pressure between the first pipe line and the second pipe line by controlling the motor and a differential pressure control valve, and controlling a brake fluid pressure generated in the W/C, an auxiliary pressure source accumulating a brake fluid pressure within a predetermined pressure range in an accumulator based on an operation of the fluid pressure pump to output the pressure as an accumulator pressure, and an electromagnetic valve controlling communication/cutoff between the fluid pressure pump, the accumulator, and the main pipe line to set a communication state so as to transmit the accumulator pressure to the W/C.

In this manner, in addition to the brake fluid pressure control actuator, the auxiliary pressure source is included. For this reason, in addition to pressurization by a pump disposed in the brake fluid pressure control actuator, pressurization by the auxiliary pressure source makes it possible to pressurize the W/C. In this manner, in comparison with a case using only a brake fluid pressure control actuator, boosting response of a W/C pressure can be further improved, and high boosting response can be achieved in urgent control such as collision avoidance which requires high boosting response of the W/C pressure. For this reason, safety can be further improved.

According to this invention, the brake fluid pressure control actuator is obtained such that a part of the main pipe line, the differential pressure control valve, and the pump are integrally built in a block, and the electromagnetic valve and the auxiliary pressure source are disposed independently of the brake fluid pressure control actuator.

In this manner, since the brake fluid pressure control actuator and the auxiliary pressure source are independently disposed, the componenets can be mounted on different positions in the vehicle. For this reason, a versatile brake device having good mountability can be achieved. In comparison with the case in which the componenets are integrated with each other, each of the components can be miniturized.

According to this invention, the block has a port to be coupled to the second pipe line coupling the differential pressure control valve of the main pipe line and the plurality of W/Cs to each other, and an auxiliary pressure transmission pipe line to which the accumulator pressure is transmitted through the electromagnetic valve is coupled to the port.

The configuration allows a brake fluid pressure control actuator having a conventional structure to be applied to the device and can improve the versatility of the device.

According to this invention, the brake fluid pressure generating means is a hydraulic booster which receives an accumulator pressure and assists operation force of the brake operation member based on the accumulator pressure to generate a brake fluid pressure.

In this manner, also in the brake device using the hydraulic booster, a combination of the brake fluid pressure control actuator and the auxiliary pressure source can achieve high boosting responses of the W/C pressures. Since a hydraulic booster and an auxiliary pressure source used in a brake device having a conventional hydraulic booster can be applied, a versatile brake device can be achieved.

According to this invention, the electromagnetic valve can be built in the brake fluid pressure control actuator.

In this manner, all various control valves can be integrally built in the brake fluid pressure control actuator to make it possible to achieve a brake device having good mountability.

DESCRIPTIONS OF EMBODIMENTS

Figure 1:
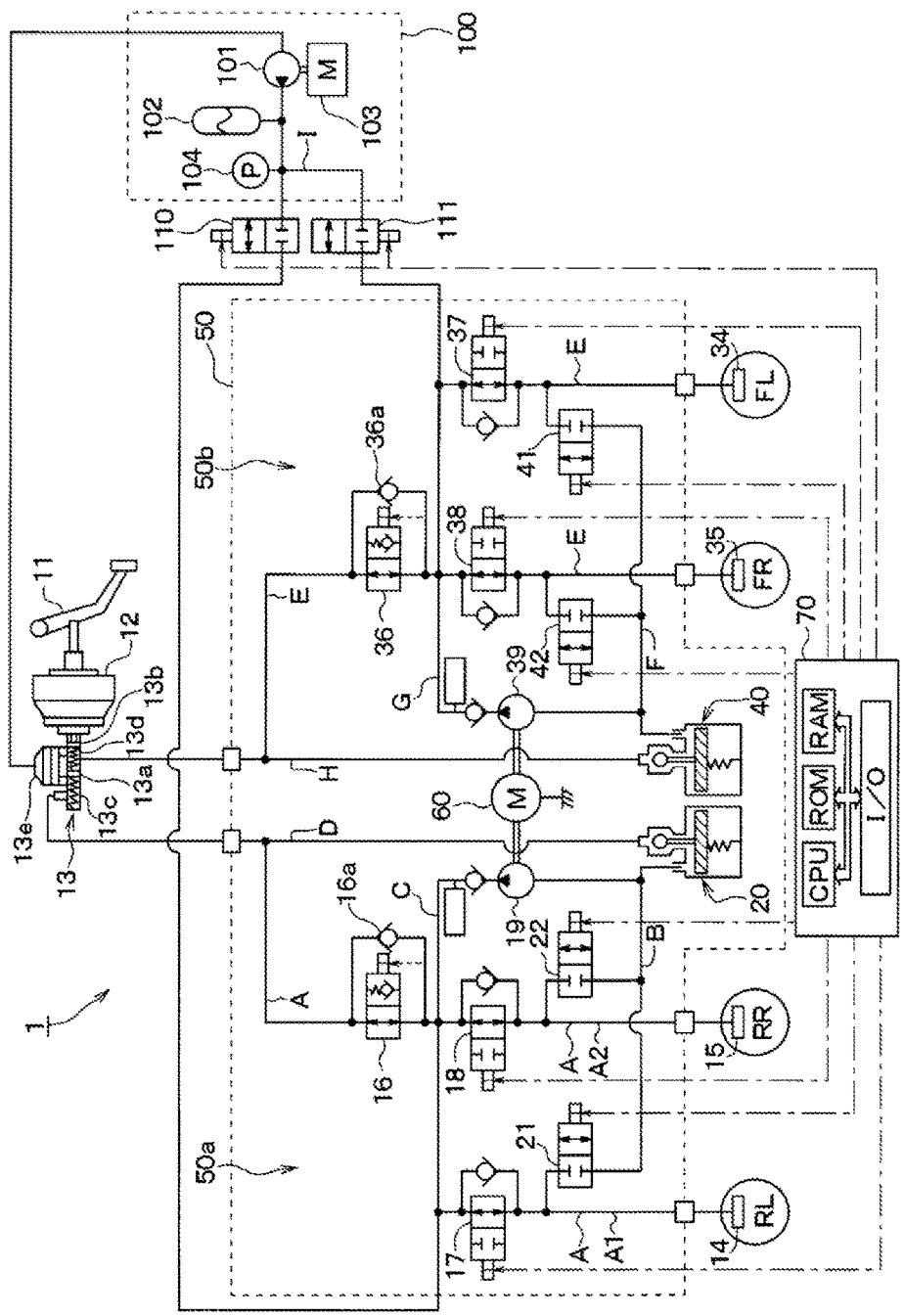
FIG. 1 is a fluid pressure circuit diagram showing a basic configuration of a brake device according to a first embodiment of the present invention.

Embodiments of the present invention will be described below with reference to the accompanying drawings. In all the following embodiments, the same reference numerals denote the same parts or equivalent parts, respectively, to explain the invention.

(First Embodiment)

Illustrated embodiments of the present invention will be described below. A brake device for vehicle according to an embodiment of the present invention will be described below. FIG. 1 is a fluid pressure circuit diagram showing a basic configuration of a brake device 1 according to the embodiment. An example in which a brake device 1 according to the present invention is applied to a vehicle in which a front-to-rear piping fluid pressure circuit is configured will be described below. However, the brake device 1 can also be applied to an X-piping vehicle or the like.

In FIG. 1, when a driver depresses a brake pedal 11 serving as a brake operation member, a booster 12 boosts force on pedal to press master pistons 13a and 13b disposed in an M/C 13 corresponding to a brake fluid pressure generating means. In this manner, equal M/C pressures are generated in a primary chamber 13c and a secondary chamber 13d partitioned by the master pistons 13a and 13b, respectively. The M/C pressures are transmitted to W/Cs 14, 15, 34, and 35 through a brake fluid pressure control actuator 50. The M/C 13 includes a master reservoir 13e having paths communicating with the primary chamber 13c and the secondary chamber 13d, respectively.

The brake fluid pressure control actuator 50 has a first pipe line system 50a and a second pipe line system 50b, and various components are mounted in a block made of aluminum or the like (not shown) to obtain an integrated configuration. The first pipe line system 50a serves as a rear system controlling brake fluid pressures applied to a rear right wheel RR and a rear left wheel RL, and the second pipe line system 50b is a front system controlling brake fluid pressures applied to a front left wheel FL and a front right wheel FR.

Since the basic configurations of the systems 50a and 50b are equal to each other, the first pipe line system 50a will be described below, and the second pipe line system 50b will not be described.

The first pipe line system 50a includes a pipe line A serving as a main pipe line transmitting the M/C pressure to the W/C 14 included in the rear left wheel RL and the W/C 15 included in the rear right wheel RR to generate W/C pressures.

The pipe line A includes a first differential pressure control valve 16 which controls the pipe line A to a communication state and a differential pressure state to control a differential pressure between the first pipe line on the M/C 13 side serving as an upstream side and a second pipe line on the W/C 14 and 15 side serving as a downstream side. In the first differential pressure control valve 16, a valve position is adjusted to set the communication state in normal braking performed when a driver operates the brake pedal 11 (when vehicle kinetic control such as collision avoidance control or antiskid control is not executed), and the valve position is adjusted such that, when a current flows in a solenoid coil included in the first differential pressure control valve 16, the larger the current value becomes, the higher the differential pressure becomes.

When the first differential pressure control valve 16 is set in a differential pressure state, only when the brake fluid pressure on the W/C 14 and 15 side is larger than the M/C pressure by a predetermined pressure or more, the brake fluid is allowed to flow only from the W/C 14 and 15 side to the M/C 13 side. For this reason, the W/C 14 and 15 side is always kept at a pressure which is not higher than that on the M/C 13 side by a predetermined pressure or more. Check valves 16a are disposed in parallel with the first differential pressure control valve 16.

The pipe line A branches into two pipe lines A1 and A2 on the W/C 14 and 15 side which is a downstream side of the first differential pressure control valve 16. The pipe line A1 includes a first boosting control valve 17 controlling boosting of a brake fluid pressure to the W/C 14, and the pipe line A2 includes a second boosting control valve 18 controlling boosting of a brake fluid pressure to the W/C 15.

The first and second boosting control valves 17 and 18 include 2-position electromagnetic valves which can control communication/cutoff states. More specifically, the first and second boosting control valves 17 and 18 are of normally open types in which the valves are controlled to communication states when control currents to solenoid coils included in the first and second boosting control valves 17 and 18 become zero (non-energization state), and the valves are controlled to cutoff states when a control current flows in the solenoid coils (energization state).

In a pipe line B serving as a reduced pressure pipe line coupling the first and second boosting control valves 17 and 18 in the pipe line A, the W/Cs 14 and 15, and a pressure-regulation reservoir 20 to each other, a first pressure-reducing control valve 21 and a second pressure-reducing control valve 22 configured by 2-position electromagnetic valves capable of controlling communication/cutoff states are disposed. The first and second pressure-reducing control valves 21 and 22 are of normally close types in which the valves are controlled to cutoff states when control currents to solenoid coils included in the first and second pressure-reducing control valves 21 and 22 become zero (non-energization state), and the valves are controlled to communication states when a control current flows in the solenoid coils (energization state).

A pipe line C serving as a back-flow pipe line is disposed between the pressure-regulation reservoir 20 and the pipe line A serving as the main pipe line. In the pipe line C, a self-priming pump 19 driven by a motor 60 sucking/discharging the brake fluid from the pressure-regulation reservoir 20 to the M/C 13 side or the W/C 14 and 15 side is disposed. The motor 60 is driven with control of energization to a motor relay (not shown).

A pipe line D serving as an auxiliary pipe line is disposed between the pressure-regulation reservoir 20 and the M/C 13. The brake fluid is sucked from the M/C 13 by the pump 19 through the pipe line D and discharged into the pipe line A to supply the brake fluid to the W/C 14 and 15 sides in vehicle kinetic control, thereby increasing the W/C pressure of a target wheel.

Although the first pipe line system 50*a* has been described above, the second pipe line system 50*b* has the same configuration as that of the first pipe line system 50*a*, and the second pipe line system 50*b* also has the same components as those included in the first pipe line system 50*a*. More specifically, a second differential pressure control valve 36 and a check valve 36*a* corresponding to the first differential pressure control valve 16 and the check valves 16*a*, third and fourth boosting control valves 37 and 38 corresponding to the first and second boosting control valves 17 and 18, third and fourth pressure-reducing control valves 41 and 42 corresponding to the first and second pressure-reducing control valves 21 and 22, a pump 39 corresponding to the pump 19, a reservoir 40 corresponding to the reservoir 20, and pipe lines E to H corresponding to the pipe lines A to D are given. However, with respect to the W/Cs 14, 15, 34, and 35 to which the brake fluid is supplied by the systems 50*a* and 50*b*, the second pipe line system 50*b* serving as a front system has a capacity larger than that of the first pipe line system 50*a* serving as a rear system. In this manner, larger braking force can be generated on the front side. Since the rear system and the front system have equal capacities in a truck or the like, the configuration of the system 50*a* is the same as that of the system 50*b*.

As shown in FIG. 1, the fluid pressure circuit of the brake device 1 according to the embodiment includes, in addition to the brake fluid pressure control actuator 50, an auxiliary pressure source 100, electromagnetic valves 110 and 111 controlling communication/cutoff between the auxiliary pressure source 100 and the W/Cs 14, 15, 34, and 35, and the like. The auxiliary pressure source 100 includes a fluid pressure pump 101, an accumulator 102, an electric motor 103, and a pressure sensor 104.

The fluid pressure pump 101, which is driven by the electric motor 103, sucks/discharges the brake fluid in a master reservoir 13*e*. The brake fluid discharged by the fluid pressure pump 101 is supplied to the accumulator 102 to perform accumulation. The brake fluid pressure accumulated by the accumulator 102 corresponds to an accumulator pressure.

The electric motor 103 is driven in response to the accumulator pressure lower than a predetermined lower limit to increase the accumulator pressure, and is stopped in response to the accumulator pressure higher than a predetermined upper limit.

The pressure sensor 104 is to monitor the accumulator pressure. The electric motor 103 is driven based on a detection signal of the pressure sensor 104 such that the accumulator pressure detected by the pressure sensor 104 is always kept within a predetermined range.

The electromagnetic valves 110 and 111 are disposed between the auxiliary pressure source 100 and the brake fluid pressure control actuator 50, more specifically, between the first and second differential pressure control valves 16 and 36 and the boosting control valves 17, 18, 37, and 38 in the fluid pressure pump 101, the accumulator 102, and the first and second pipe line systems 50*a* and 50*b*. The electromagnetic valves 110 and 111 are of normally close types in which the valves are controlled to cutoff states when control currents to solenoid coils included in the electromagnetic valves 110 and 111 become zero (non-energization state), and the valves are controlled to communication states when a control current flows in the solenoid coils (energization state). For this reason, the electromagnetic valves 110 and 111 is configured not to transmit the accumulator pressure to the W/Cs 14, 15, 34, and 35 in a non-energization state and to transmit the accumulator pressure to the W/Cs 14, 15, 34, and 35 in an energization state.

The auxiliary pressure transmission pipe line I transmitting the accumulator pressure from the auxiliary pressure source 100 through the electromagnetic valves 110 and 111 is coupled to a port coupled to the downstream side of the differential pressure control valves 16 and 36 included in the block of the brake fluid pressure control actuator 50, i.e., to the W/C 14, 15, 34, and 35 side. In this manner, when the electromagnetic valves 110 and 111 are set in communication state, the W/C pressures depending on differential pressures set by the differential pressure control valves 16 and 36 can be transmitted to the W/Cs 14, 15, 34, and 35.

The brake device 1 includes a brake ECU 70. The brake ECU 70 includes a known microcomputer including a CPU, a ROM, a RAM, an I/O, and the like and executes processing such as various arithmetic operations according to a program stored in the ROM to execute accumulation in the accumulator 102 and vehicle kinetic control such as collision avoidance control or antiskid control.

More specifically, the brake ECU 70 controls the electric motor 103 based on a detection signal of the pressure sensor 104 such that the accumulator pressure falls within a predetermined range (for example, 10 to 15 MPa). The brake ECU 70 calculates various physical quantities based on detection signals of sensors and the like (not shown), determines based on the calculation results whether the vehicle kinetic control is executed, and, when the vehicle kinetic control is executed, calculates a control quantity to a wheel to be controlled, i.e., a W/C pressure generated in the W/C of the wheel to be controlled. Based on the result, the brake ECU 70 executes current supply control to the control valves 16 to 18, 21, 22, 36 to 38, 41, 42, 110, and 111 and current amount control for the motor 60 to drive the pumps 19 and 39 to control the W/C pressure of a wheel to be controlled and to execute the vehicle kinetic control.

For example, in normal braking executed when the brake pedal 11 is depressed, when pressurization is requested by executing the collision avoidance control or the antiskid control, the electromagnetic valves 110 and 111 are switched to the communication states. At the same time, the pumps 19 and 39 are driven, and the first and second differential pressure control valves 16 and 36 are set in differential pressure states. In this manner, the accumulator pressure is transmitted from the accumulator 102 to the W/Cs 14, 15, 34, and 35 through the auxiliary pressure transmission pipe line I and the pipe lines A and E. The operations of the pumps 19 and 39 allow the brake fluid in the M/C 13 to be supplied to the W/C 14, 15, 34, and 35 sides through the pipe lines D and H. Since the first and second differential pressure control valves 16 and 36 are set in the differential pressure states, the brake fluid pressure on the downstream side of the first and second differential pressure control valves 16 and 36 becomes a pressure depending on a set differential pressure, and a W/C pressure depending on a pressurization request is applied to the W/Cs 14, 15, 34, and 35.

In the collision avoidance control or the antiskid control, the first to fourth boosting control valves 17, 18, 37, and 38 and the first to fourth pressure-reducing control valves 21, 22, 41, and 42 are appropriately controlled to control an increase/reduction in pressure of the W/C pressure of a wheel to be controlled and to perform control to make the W/C pressures desired control quantities.

When antiskid (ABS) control is executed when wheels slip in normal braking, the first to fourth boosting control valves 17, 18, 37, and 38 and the first to fourth pressure-reducing control valves 21, 22, 41, and 42 are appropriately controlled, and the pumps 19 and 39 are driven to control an increase/reduction in pressure of the W/C pressures and to perform control to make the W/C pressures desired control quantities.

Figure 2:
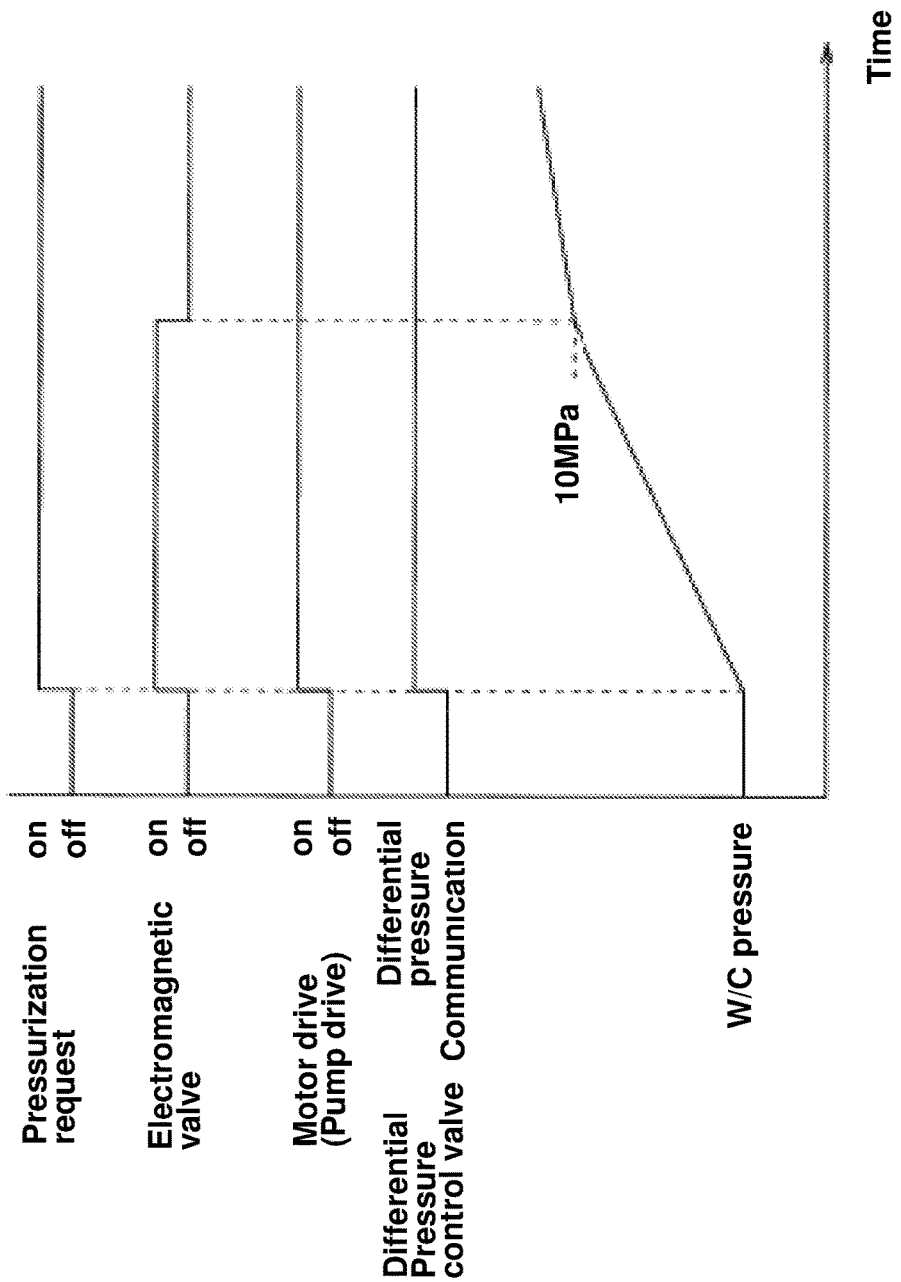
FIG. 2 is a time chart showing an example of an operation of the brake device shown in FIG. 1.

FIG. 2 is a time chart showing an example of an operation of the brake device 1 according to the embodiment. As shown in the drawing, when a pressurization request is output when a driver depresses the brake pedal 11 or vehicle kinetic control is executed, energization to the electromagnetic valves 110 and 111 is turned on accordingly, the first and second differential pressure control valves 16 and 36 are controlled to the differential pressure states, and the motor 60 is also driven. In this manner, the W/Cs 14, 15, 34, and 35 are pressurized with both the accumulator pressure and the pumps 19 and 39. Thus, boosting responses of the W/C pressures can further be improved.

When the W/C pressure reaches a predetermined value (10 MPa in the shown example), the pressurization performed by the accumulator pressure is canceled. Thereafter, the W/Cs 14, 15, 34, and 35 are boosted by only the pumps 19 and 39. In this manner, in a region requiring urgency, i.e., a low-pressure region in which the W/C pressure is rarely generated, pressurization by the accumulator pressure is used. When the W/C pressure is generated to some extent, the pressurization by the accumulator pressure is canceled to make it possible to perform only pressurization by the pumps 19 and 39.

In this manner, the brake device 1 according to the present invention is configured. The brake device 1 configured as described above includes, in addition to the brake fluid pressure control actuator 50, the auxiliary pressure source 100. For this reason, in addition to pressurization by the pumps 19 and 39 disposed in the brake fluid pressure control actuator 50, the W/Cs 14, 15, 34, and 35 can be pressurized by pressurization performed by the auxiliary pressure source 100. In this manner, in comparison with a case using only the brake fluid pressure control actuator 50, boosting response of a W/C pressure can be further improved, and high boosting response can be achieved in urgent control such as collision avoidance which requires high boosting response of the W/C pressure. For this reason, safety can be further improved.

In the brake device 1 having the above configuration, the brake fluid pressure control actuator 50 conventionally used can be used without change. Furthermore, since the brake fluid pressure control actuator 50, the auxiliary pressure source 100, and the electromagnetic valves 110 and 111 are independently disposed, the components can be mounted on different positions in the vehicle. For this reason, the versatile brake device 1 having good mountability can be achieved. In particular, in a large-size vehicle such as a truck, since the accumulator 102 in which a high pressure is kept can be disposed out of the vehicle interior, safety in the vehicle interior can also be secured. Furthermore, since the electromagnetic valves 110 and 111 can be disposed close to the auxiliary pressure source 100, the number of parts to which high accumulator pressures are applied can be reduced to make it possible to further improve the safety.

Since the W/C pressure can be generated by using the two parts, i.e., the brake fluid pressure control actuator 50 and the auxiliary pressure source 100, in comparison with a case using only one of the parts, the boosting performances thereof can also be reduced. For this reason, miniaturization of the motor 60 and miniaturization of the accumulator 102 can be achieved.

In addition, in a region requiring urgency, i.e., a low-pressure region in which the W/C pressure is rarely generated, pressurization by the accumulator pressure is used. When the W/C pressure is generated to some extent, the pressurization by the accumulator pressure is canceled to make it possible to perform only pressurization by the pumps 19 and 39. In this manner, further miniaturization of the accumulator 102 can be achieved.

The pressurization by the accumulator pressure in the auxiliary pressure source 100 is performed only when vehicle kinetic control such as collision avoidance control requiring urgency is executed, and is prevented from being performed in normal braking. In this manner, a frequency of pressurization by the accumulator pressure can be reduced, and an endurance load of the auxiliary pressure source 100 can also be reduced.

(Second Embodiment)

A second embodiment of the present invention will be described below. In this embodiment, in the brake device 1 using a hydraulic booster, the brake fluid pressure control actuator 50 and the auxiliary pressure source 100 are combined to each other. Also in the embodiment, since the basic configuration of the brake device 1 is the same as that in the first embodiment, only parts different from those in the first embodiment will be described.

Figure 3:
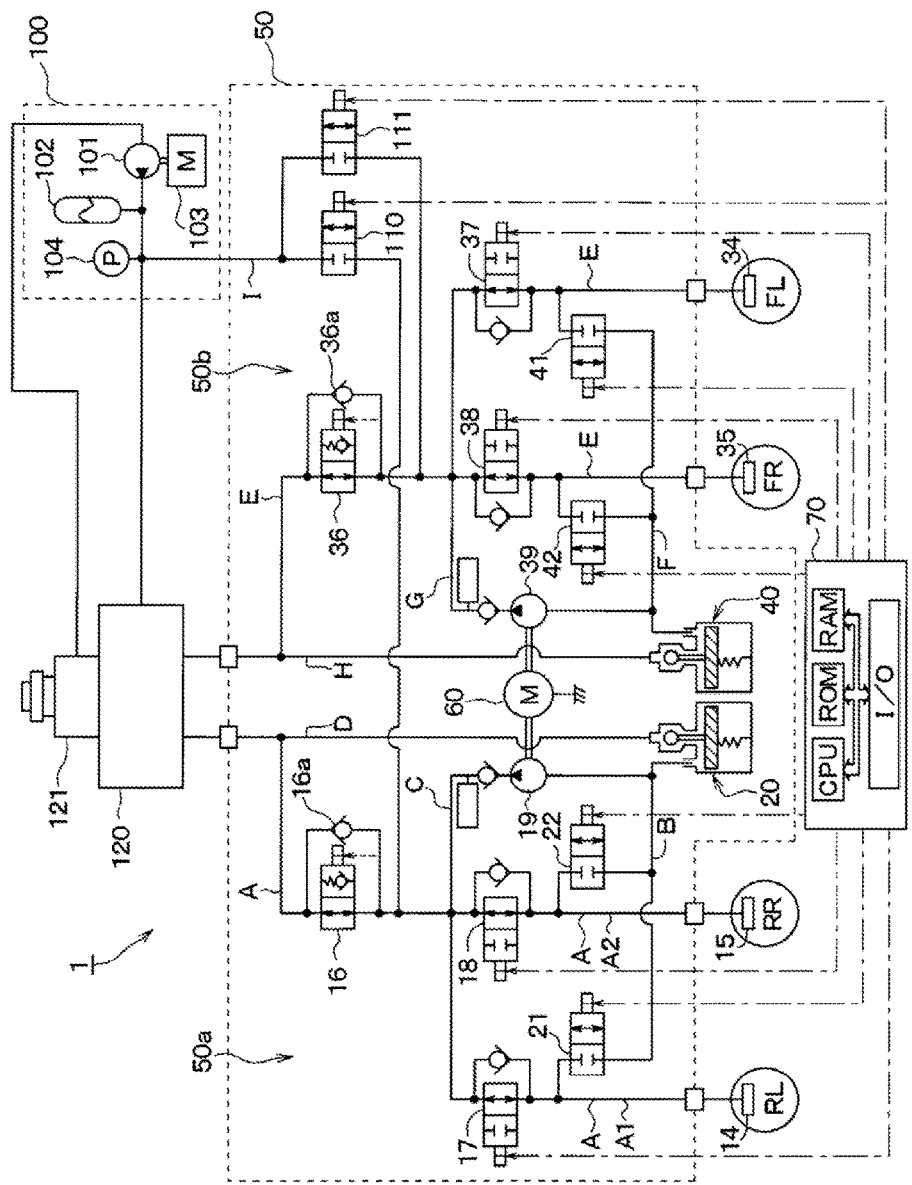
FIG. 3 is a fluid pressure circuit diagram showing a basic configuration of a brake device according to a second embodiment of the present invention.

FIG. 3 is a fluid pressure circuit diagram showing a basic configuration of the brake device 1 according to the embodiment. As shown in FIG. 3, in the embodiment, the brake device 1 using a hydraulic booster 120 is given. The brake device 1 also includes the brake fluid pressure control actuator 50 and the auxiliary pressure source 100. The brake fluid pressure control actuator 50 and the auxiliary pressure source 100 are coupled to the hydraulic booster 120, and these components are driven based on a pressurization request made when a driver depresses the brake pedal 11 or vehicle kinetic control is executed to generate braking force.

The auxiliary pressure source 100 and a low-pressure reservoir 121 are coupled to the hydraulic booster 120. As in the first embodiment, the auxiliary pressure source 100 includes the fluid pressure pump 101, the accumulator 102, the electric motor 103, and the pressure sensor 104. However, in the embodiment, the electromagnetic valves 110 and 111 are built in the brake fluid pressure control actuator 50. The electric motor 103 drives the fluid pressure pump 101 to suck/discharge brake fluid in the low-pressure reservoir 121 and to accumulate an accumulator pressure in the accumulator 102. The brake fluid pressure accumulated in the accumulator 102 is designed to be input to the hydraulic booster 120.

The hydraulic booster 120 inputs an accumulator pressure and assists operation force (force on pedal) of the brake pedal 11 to generate a high brake fluid pressure when a driver depresses the brake pedal 11. In the embodiment, the hydraulic booster 120 constitutes a brake fluid pressure generating means. As the hydraulic booster 120, a conventionally used hydraulic booster having an ordinary configuration can be applied.

In this manner, also in the brake device 1 using the hydraulic booster 120, a combination of the brake fluid pressure control actuator 50 and the auxiliary pressure source 100 can achieve high boosting responses of the W/C pressures. For this reason, the brake device 1 using the hydraulic booster 120 can obtain the same effect as that in the first embodiment. In the configuration of the embodiment, since a hydraulic booster and an auxiliary pressure source used in the brake device 1 having a conventional hydraulic booster can be applied as the hydraulic booster 120 and the auxiliary pressure source 100, the versatile brake device 1 can be achieved.

In the embodiment, the electromagnetic valves 110 and 111 are built in the brake fluid pressure control actuator 50. In this case, a brake fluid pressure control actuator having a conventional structure cannot be applied without change as the brake fluid pressure control actuator 50, and the brake fluid pressure control actuator 50 disadvantageously increases in size. However, all the various control valves 16 to 18, 21, 22, 36 to 38, 41, 42, 110, and 111 can be integrally assembled in the block configuring the brake fluid pressure control actuator 50, and the brake device 1 having good mountability can be achieved.

(Another Embodiment)

The present invention is not limited to the above embodiments, and can be arbitrarily changed and modified without departing from the scope of claims.

For example, in the above embodiments, the brake ECU 70 performs not only control of the various parts included in the brake fluid pressure control actuator 50 but also control of the electric motor 103 included in the auxiliary pressure source 100 and control of the electromagnetic valves 110 and 111. However, these components described above are only examples. For example, the ECU which drives the electric motor 103 included in the auxiliary pressure source 100 based on a detection signal of the pressure sensor 104 to control the accumulator pressure within a predetermined range may be disposed independently of the brake ECU 70.

In the first embodiment, the electromagnetic valves 110 and 111 are disposed outside the brake fluid pressure control actuator 50, and the an auxiliary pressure transmission pipe line I is coupled to a port coupled to the downstream side of the differential pressure control valves 16 and 36 included in the block of the brake fluid pressure control actuator 50. This is to make the brake fluid pressure control actuator 50 having a conventional structure applicable, i.e., improve versatility or miniaturize the parts. Another structure may be employed if these objects are not considered. For example, also in the first embodiment, as in the second embodiment, the electromagnetic valves 110 and 111 may be built in the brake fluid pressure control actuator 50.

Furthermore, in the embodiment, the auxiliary pressure source 100 is used until the W/C pressure reaches a predetermined value (for example, 10 MPa), and only the pumps 19 and 39 are used while the W/C pressure falls within a pressure range higher than the predetermined value. This is also only an example. The pressure range in which a pressure can be accumulated as the accumulator pressure is set to an upper limit, and a pressurization form using both the auxiliary pressure source 100 and the pumps 19 and 39 can also be used until the accumulator pressure reaches the upper limit. The W/C pressure can be controlled to a differential pressure set by each of the differential pressure control valves 16 and 36. However, when differential pressure control valves which can linearly adjust differential pressures are used as the first to fourth boosting control valves 17, 18, 37, and 38, the differential pressure control valves are also controlled to make it possible to control the W/C pressure. When the differential pressure control valves which can linearly adjust differential pressures are used as the electromagnetic valves 110 and 111, an accumulator pressure transmitted to the W/C pressure can also be linearly adjusted.

Although the brake pedal 11 is exemplified as the brake operation member, a brake lever or the like may be used as the brake operation member.

REFERENCE SIGNS LIST

1: brake device, 11: brake pedal, 13: M/C, 14, 15, 34, 35: W/C, 16, 36: first and second differential pressure control valves, 17, 18, 37, 38: first to fourth boosting control valves, 19, 39: pump, 20, 40: pressure-regulation reservoir, 21, 22, 41, 42: first to fourth pressure-reducing control valves, 50: brake fluid pressure control actuator, 60: motor, 100: auxiliary pressure source, 101: fluid pressure pump, 102: accumulator, 103: electric motor, 104: pressure sensor, 110, 111: electromagnetic valve, 120: hydraulic booster, 121: low-pressure reservoir

The invention claimed is:

1. A brake device comprising:
a brake fluid pressure control actuator having a main pipe line coupling a brake fluid pressure generating means generating a brake fluid pressure in accordance with an operation of a brake operation member with a plurality of wheel cylinders, a differential pressure control valve disposed in the main pipe line, dividing the main pipe line into a first pipe line on the brake fluid pressure generating means side and a second pipe line on the plurality of wheel cylinder sides, and generating a differential pressure to control a differential pressure between the first pipe line and the second pipe line, a motor, and a pump driven with the motor to suck/discharge a brake fluid, controlling a differential pressure between the first pipe line and the second pipe line by controlling the motor and the differential pressure control valve, and controlling a brake fluid pressure generated in the wheel cylinder;
an auxiliary pressure source accumulating a brake fluid pressure within a predetermined range in an accumulator based on an operation of the fluid pressure pump to output the pressure as an accumulator pressure; and
an electromagnetic valve controlling communication/cut-off between the accumulator and the main pipe line to set a communication state so as to transmit the accumulator pressure to the wheel cylinder, wherein
in case of emergency,
the electromagnetic valve is switched to the communication state, the pump of the brake fluid pressure control actuator is driven, and the differential pressure control valve is set in a differential pressure state,
so as to pressurize the wheel cylinder with both the accumulator pressure and the pump.

2. The brake device according to claim 1, wherein the brake fluid pressure control actuator is obtained such that a part of the main pipe line, the differential pressure control valve, and the pump are integrally built in a block, and the electromagnetic valve and the auxiliary pressure source are disposed independently of the brake fluid pressure control actuator.

3. The brake device according to claim 2, wherein the block has a port to be coupled to the second pipe line coupling the differential pressure control valve of the main pipe line and the plurality of wheel cylinders to each other, and an auxiliary pressure transmission pipe line to which the accumulator pressure is transmitted through the electromagnetic valve is coupled to the port.

4. The brake device according to claim 1, wherein the electromagnetic valve is built in the brake fluid pressure control actuator.

* * * * *